(12) United States Patent
Park et al.

(10) Patent No.: US 9,191,599 B2
(45) Date of Patent: Nov. 17, 2015

(54) CORRELATED DOUBLE SAMPLING CIRCUIT AND IMAGE SENSOR INCLUDING THE SAME

(71) Applicant: SAMSUNG ELECTRONICS CO., LTD., Suwon-Si, Gyeonggi-Do (KR)

(72) Inventors: Yu-Jin Park, Seoul (KR); Kyo-Jin Choo, Seoul (KR); Ji-Hun Shin, Seoul (KR); Ji-Min Cheon, Yongin-Si (KR); Jin-Ho Seo, Seoul (KR); Seog-Heon Ham, Suwon-Si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 215 days.

(21) Appl. No.: 13/778,591

(22) Filed: Feb. 27, 2013

(65) Prior Publication Data

US 2013/0270420 A1    Oct. 17, 2013

(30) Foreign Application Priority Data

Apr. 13, 2012  (KR) .................. 10-2012-0038219

(51) Int. Cl.
| | |
|---|---|
| *H04N 5/335* | (2011.01) |
| *H04N 5/00* | (2011.01) |
| *H04N 5/378* | (2011.01) |
| *H04N 5/357* | (2011.01) |

(52) U.S. Cl.
CPC ............. *H04N 5/378* (2013.01); *H04N 5/3575* (2013.01)

(58) Field of Classification Search
CPC .......................... H04N 5/378; H01L 27/14831
USPC ........... 348/241, 302, 162; 250/208.1, 370.09
See application file for complete search history.

(56) References Cited

U.S. PATENT DOCUMENTS

| | | | |
|---|---|---|---|
| 2005/0224842 A1 * | 10/2005 | Toyama ........................ 257/225 |
| 2010/0039554 A1 | 2/2010 | Tejada et al. |
| 2010/0188542 A1 * | 7/2010 | Mizuguchi et al. ........... 348/302 |

FOREIGN PATENT DOCUMENTS

| | | |
|---|---|---|
| JP | 2003-134303 | 5/2003 |
| KR | 1019159 B1 | 3/2011 |

* cited by examiner

*Primary Examiner* — Joel Fosselman
(74) *Attorney, Agent, or Firm* — Volentine & Whitt, PLLC

(57) ABSTRACT

A correlated double sampling (CDS) circuit included in an image sensor includes a sampling unit and a timing controlled band-limitation (TCBL) unit. The sampling unit is configured to generate an output signal by performing a CDS operation with respect to a reset component of an input signal and an image component of the input signal based on a ramp signal, the input signal being provided from a pixel array included in the image sensor. The TCBL unit is connected to the sampling unit, and is configured to remove noise from the output signal based on a timing control signal. The timing control signal is activated during a first comparison duration, in which a first comparison operation is performed with respect to the ramp signal and the reset component of the input signal, and during a second comparison duration, in which a second comparison operation is performed with respect to the ramp signal and the image component of the input signal.

20 Claims, 9 Drawing Sheets

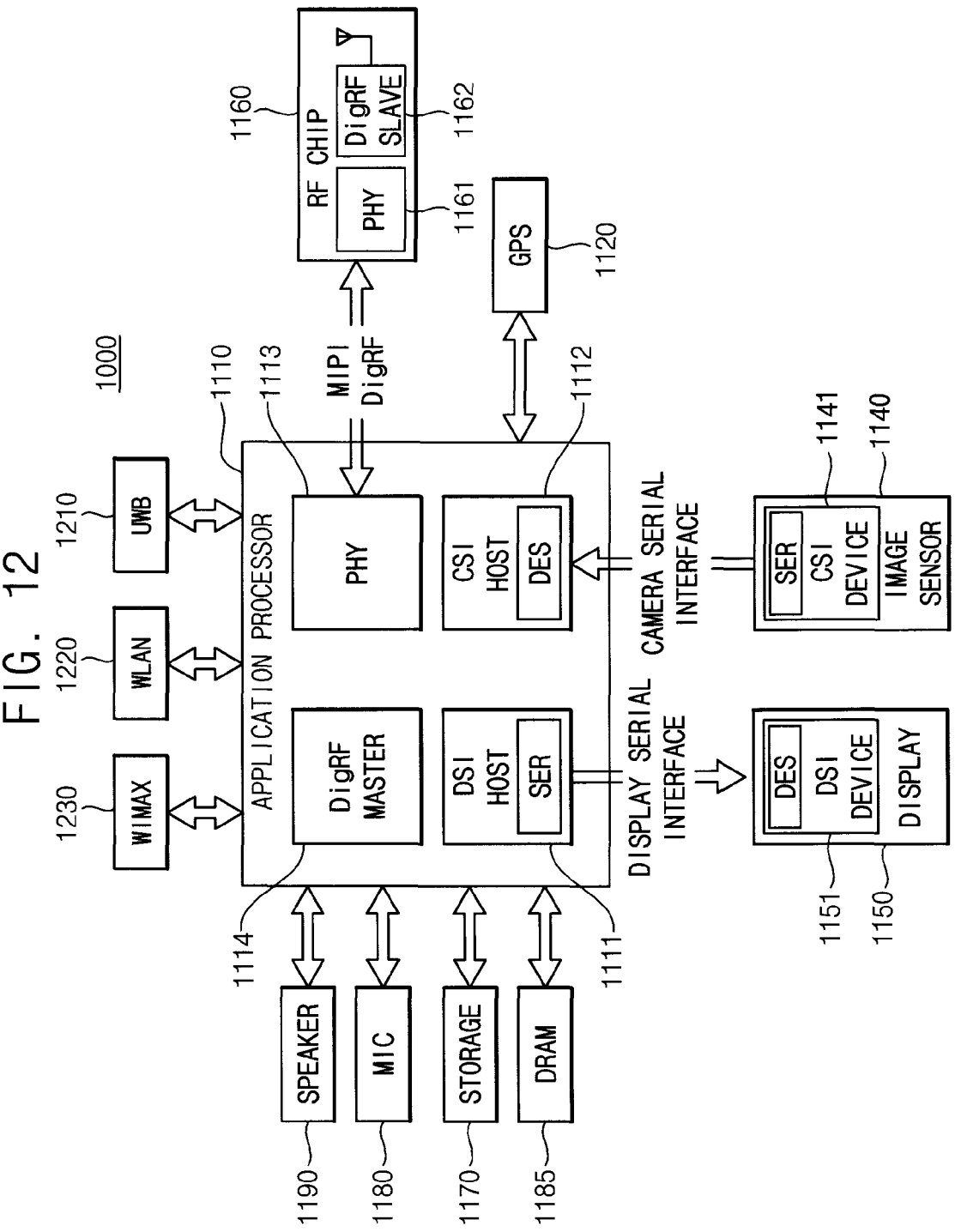

CORRELATED DOUBLE SAMPLING CIRCUIT AND IMAGE SENSOR INCLUDING THE SAME

CROSS-REFERENCE TO RELATED APPLICATION

A claim for priority under 35 U.S.C. §119 is made to Korean Patent Application No. 10-2012-0038219, filed on Apr. 13, 2012, in the Korean Intellectual Property Office, the entire contents of which are hereby incorporated by reference.

BACKGROUND

Exemplary embodiments generally relate to correlated double sampling technologies, and more particularly to correlated double sampling circuits and image sensors including correlated double sampling circuits.

Charge coupled device (CCD) image sensors and complementary metal oxide semiconductor (CMOS) image sensors have been used as devices for capturing images. In general, analog pixel signals output from pixel arrays of the CMOS image sensors may have variations due to differences between intrinsic characteristics of pixels, such as fixed pattern noise (FPN). To reduce the FPN, a correlated double sampling (CDS) technology may be used to operate the CMOS image sensors. Recently, various schemes have been proposed to reduce random noise, as well as the FPN.

SUMMARY

Some exemplary embodiments provide a correlated double sampling circuit capable of effectively reducing random noise, without increasing the size of the image sensor. Some exemplary embodiments provide an image sensor having the correlated double sampling circuit for improving a signal-no-noise ratio (SNR).

According to exemplary embodiments, a correlated double sampling (CDS) circuit included in an image sensor includes a sampling unit and a timing controlled band-limitation (TCBL) unit. The sampling unit is configured to generate an output signal by performing a CDS operation with respect to a reset component of an input signal and an image component of the input signal based on a ramp signal, the input signal being provided from a pixel array included in the image sensor. The TCBL unit is connected to the sampling unit, and is configured to remove noise from the output signal based on a timing control signal. The timing control signal is activated during a first comparison duration, in which a first comparison operation is performed with respect to the ramp signal and the reset component of the input signal, and during a second comparison duration, in which a second comparison operation is performed with respect to the ramp signal and the image component of the input signal.

The TCBL unit may be configured to perform a first pre-charge operation based on the timing control signal during a first pre-charge duration before the first comparison duration, and to perform a first noise removing operation with respect to the output signal based on the timing control signal and a result of the first pre-charge operation during the first comparison duration. The TCBL unit may be further configured to perform a second pre-charge operation based on the timing control signal during a second pre-charge duration after the first comparison duration and before the second comparison duration, and to perform a second noise removing operation with respect to the output signal based on the timing control signal and a result of the second pre-charge operation during the second comparison duration.

A first duration, from a starting time point of the first comparison duration to an intermediate time point of the first comparison duration at which a value of the ramp signal equals a value of the input signal, may correspond to the reset component of the input signal. A second duration, from a starting time point of the second comparison duration to an intermediate time point of the second comparison duration at which a value of the ramp signal is equal to a value of the input signal, may correspond to the image component of the input signal.

The sampling unit may include a first comparison unit configured to compare the ramp signal with the input signal to generate the output signal. The TCBL unit may be connected to an output terminal of the first comparison unit to provide the output signal.

The TCBL unit may include a capacitor connected between a ground voltage terminal and a first node; a first switch configured to selectively connect the first node to a first voltage terminal, to which a first voltage having a voltage level substantially equal to a logic high level of the output signal is applied, based on an inverted signal of the timing control signal; and a second switch configured to selectively connect the first node with the output terminal of the first comparison unit based on the timing control signal.

The sampling unit may include a first comparison unit configured to compare the ramp signal with the input signal to generate an intermediate signal; and a second comparison unit configured to compare the intermediate signal with a reference signal to generate the output signal.

The TCBL unit may be connected to an output terminal of the first comparison unit to provide the intermediate signal. The TCBL unit may include a capacitor connected between a ground voltage terminal and a first node; a first switch configured to selectively connect the first node with a first voltage terminal, to which a first voltage having a voltage level substantially equal to a logic high level of the intermediate signal is applied, based on an inverted signal of the timing control signal; and a second switch configured to selectively connect the first node with the output terminal of the first comparison unit based on the timing control signal. The TCBL unit may be connected to an output terminal of the second comparison unit to provide the output signal.

The TCBL unit may include a first TCBL block connected to an output terminal of the first comparison unit to provide the intermediate signal, and a second TCBL block connected to an output terminal of the second comparison unit to provide the output signal.

The sampling unit may include a first comparison unit configured to compare the ramp signal with the input signal to generate a first intermediate signal, a second comparison unit configured to compare the first intermediate signal with a first reference signal to generate a second intermediate signal, and a third comparison unit configured to compare the second intermediate signal with a second reference signal to generate the output signal.

The TCBL unit may include at least one TCBL block. The at least one TCBL block may be connected to one of an output terminal of the first comparison unit to provide the first intermediate signal, an output terminal of the second comparison unit to provide the second intermediate signal, and an output terminal of the third comparison unit to provide the output signal.

According to exemplary embodiments, an image sensor includes a pixel array, a CDS unit, and an analog-to-digital converting unit. The pixel array includes multiple unit pixels configured to detect incident light and to generate pixel signals respectively corresponding to the incident light. The CDS unit is configured to generate sampling signals by performing a CDS operation with respect to the pixel signals. The analog-to-digital converting unit is configured to convert the sampling signals into digital signals. The CDS unit includes multiple CDS circuits connected to column lines of the pixel array, respectively. Each CDS circuit includes a sampling unit and a TCBL unit. The sampling unit is configured to generate a first sampling signal among the sampling signals by performing the CDS operation with respect to reset and image components of a first pixel signal among the pixel signals based on a ramp signal. The TCBL unit is connected to the sampling unit, and is configured to remove noise from the first sampling signal based on a timing control signal. The timing control signal is activated during a first comparison duration to perform a first comparison operation with respect to the ramp signal and the reset component of the first pixel signal, and during a second comparison duration to perform a second comparison operation with respect to the ramp signal and the image component of the first pixel signal.

The image sensor may further include a timing controller configured to control operations of the CDS unit and the analog-to-digital converting unit and to generate the timing control signal. The image sensor may further include a voltage generator configured to generate the ramp signal based on a ramp enable signal.

According to exemplary embodiments, the correlated double sampling circuit includes the TCBL unit for removing random noise from the output signal based on the timing control signal. The TCBL unit has a simpler structure, and performs the pre-charge operation and the noise removing operation based on the timing control signal, thereby effectively reducing the random noise of the output signal without having to increase in size. Also, the SNR of the image sensor including the correlated double sampling circuit may be improved.

According to exemplary embodiments, a CDS circuit included in an image sensor includes a sampling unit and a TCBL unit. The sampling unit is configured to generate an output signal in response to an input signal provided from a pixel array of the image sensor, the sampling unit including at least a first comparison unit configured to compare the input signal and a ramp signal. The TCBL unit is connected to one of an end portion or an intermediate portion of the sampling unit. The TCBL unit is configured to remove noise from the output signal in response to a timing control signal during a first comparison duration, in which the first comparison unit performs a first comparison operation with respect to the ramp signal and a reset component of the input signal, and the TCBL unit is configured to remove noise from the output signal in response to the timing signal during a second comparison duration, in which the first comparison unit performs a second comparison operation with respect to the ramp signal and an image component of the input signal. The first comparison unit may be an operational transconductance amplifier (OTA).

The TCBL unit may include a first TCBL block connected to a first output node of the first comparison unit. The first TCBL block may include a capacitor connected between a ground voltage terminal and a first node; a first switch configured to selectively connect the first node to a first voltage terminal in response to activation of an inverted signal of the timing control signal; and a second switch configured to selectively connect the first node to the first output node of the first comparison unit in response to activation of the timing control signal. A first voltage may be applied to the first voltage terminal, where the first voltage has a voltage level substantially equal to a logic high level of a signal at the first output node of the first comparison unit.

The sampling unit may further include a second comparison unit configured to compare a signal output by the first comparison unit and a reference signal for providing the output signal. The TCBL unit may further include a second TCBL block connected to a second output node of the second comparison unit. The second TCBL block may include a capacitor connected between a ground voltage terminal and a second node; a third switch configured to selectively connect the second node to a second voltage terminal in response to activation of an inverted signal of the timing control signal; and a fourth switch configured to selectively connect the second node to the second output node of the second comparison unit in response to activation of the timing control signal for removing noise from the output signal. A second voltage may be applied to the second voltage terminal, where the second voltage has a voltage level substantially equal to a logic high level of a signal at the second output node of the second comparison unit.

BRIEF DESCRIPTION OF THE DRAWINGS

Illustrative embodiments will be more clearly understood from the following detailed description taken in conjunction with the accompanying drawings.

FIG. 12 is a block diagram illustrating an interface used in the computing system of FIG. 11, according to an exemplary embodiment.

DETAILED DESCRIPTION OF THE EMBODIMENTS

Figure 1:
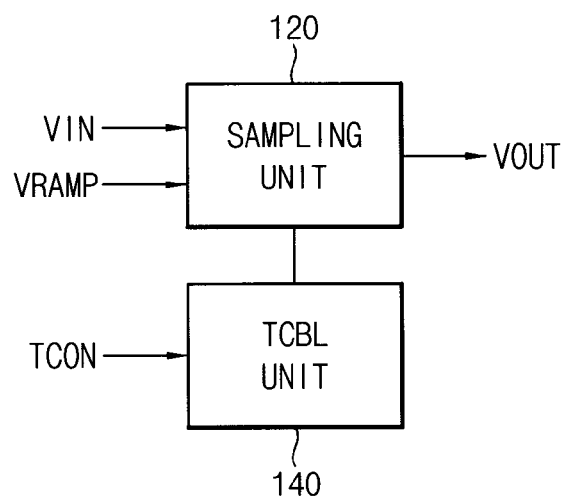
FIG. 1 is a block diagram illustrating a correlated double sampling (CDS) circuit, according to exemplary embodiments.

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. In the drawings, the sizes and relative sizes of features, layers and regions may be exaggerated for clarity. Unless otherwise noted, like reference numerals denote like elements throughout the attached drawings and written description, and thus descriptions will not be repeated.

It will be understood that, although the terms first, second, third, etc., may be used herein to describe various elements, these elements should not be limited by these terms. These terms are used to distinguish one element from another. Thus, a first element discussed below could be termed a second element without departing from the scope of the present teachings. As used herein, the term "and/or" includes any and all combinations of one or more of the associated listed items. The term "exemplary" refers to an illustration or example.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular exemplary embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a correlated double sampling (CDS) circuit, according to exemplary embodiments.

The CDS circuit 100 illustrated in FIG. 1 may be included in an image sensor to perform a CDS operation with respect to an analog pixel signal output from a pixel array. Hereinafter, the various exemplary embodiments will be described based on a complementary metal oxide semiconductor (CMOS) image sensor. However, it is understood that the CDS circuit 100 may be used in other types of image sensors, including a charge-coupled device (CCD) image sensor, without departing from the scope of the present teachings. Detailed configurations of CMOS image sensors and unit pixels included in CMOS image sensors will be described below with reference to FIGS. 8 and 9.

Referring to FIG. 1, the CDS circuit 100 includes a sampling unit 120 and a timing controlled band-limitation (TCBL) unit 140.

The sampling unit 120 generates an output signal VOUT by performing the CDS operation with respect to a reset component of an input signal VIN and an image component of the input signal VIN based on a ramp signal VRAMP. The input signal is provided from a pixel array that is included in the image sensor (e.g., the CMOS image sensor). Analog pixel signals (e.g., the input signal VIN) output from the pixel array may have variations due to the intrinsic characteristics of pixels, such as fixed pattern noise (FPN), and/or due to variation in the characteristics of logics for outputting voltage signals from pixels. Accordingly, an effective signal component can be extracted by calculating the difference between a voltage signal based on the reset component and a voltage signal based on the image component. As described above, the reset component and the image component may be detected, and the difference between the reset and image components may be extracted as the effective signal component, which is referred to as the CDS.

The TCBL unit 140 is connected to the sampling unit 120. The TCBL unit 140 removes noise from the output signal VOUT based on a timing control signal TCON. The timing control signal TCON is activated during a first comparison duration in which a first comparison operation is performed with respect to the ramp signal VRAMP and the reset component of the input signal VIN, and during a second comparison duration in which a second comparison operation is performed with respect to the ramp signal VRAMP and the image component of the input signal VIN. For example, the TCBL unit 140 may perform a first noise removing operation to remove random noise from the output signal VOUT corresponding to the reset component of the input signal VIN during the first comparison duration, and may perform a second noise removing operation to remove random noise from the output signal VOUT corresponding to the image component of the input signal VIN during the second comparison duration. The first and second noise removing operations will be described with reference to FIGS. 2 and 3 below.

Here, "the timing control signal TCON is activated" refers to transition of the timing control signal TCON from a first logic level to a second logic level. For example, the first logic level may be a logic low level, and the second logic level may be a logic high level.

In various exemplary embodiments, the TCBL unit 140 may be connected to an end portion or an intermediate portion of the sampling unit 120, or may be connected to both the end portion and the intermediate portion of the sampling unit 120, depending on the structure of the sampling unit 120. The structure of the sampling unit 120 and the structure of the TCBL unit 140 according to exemplary embodiments will be described below with reference to FIGS. 2, 4, 5, 6, and 7.

To reduce random noise of an output signal of a CDS circuit, a conventional image sensor employs a multiple sampling technique and/or a signal-to-noise ratio (SNR) technique. The multiple sampling technique includes averaging noise by performing sampling with respect to a pixel signal, which is output from a pixel array, several times, and the SNR technique includes improving the SNR characteristic by arranging a programmable gain amplifier (PGA) on the output path of the pixel signal. However, in conventional image sensors employing these conventional technologies, the complexity of the signal processing unit in the image sensor increases, and thus the size of the image sensor likewise increases. In addition, as the total performance of the signal processing unit improves, so that random noise is mainly caused by dark current generated from a pixel, for example, instead of the signal processing procedure of the signal processing unit, the SNR may not improve even when a PGA is arranged on the output path of the pixel signal.

According to exemplary embodiments, the CDS circuit 100 includes the TCBL unit 140, which is configured to reduce random noise of the output signal VOUT corresponding to the reset component of the input signal VIN during the first comparison duration, and to reduce random noise of the output signal VOUT corresponding to the image component of the input signal VIN during the second comparison duration, based on the timing control signal TCON. The TCBL unit 140 may be implemented with a relatively simple configuration, as will be described below with reference to FIGS. 2, 4, 5, 6, and 7. Accordingly, the CDS circuit 100 is not only able to reduce effectively the random noise of the output signal VOUT without increasing in size, but can improve the SNR of the image sensor the includes the CDS circuit 100.

Figure 2:
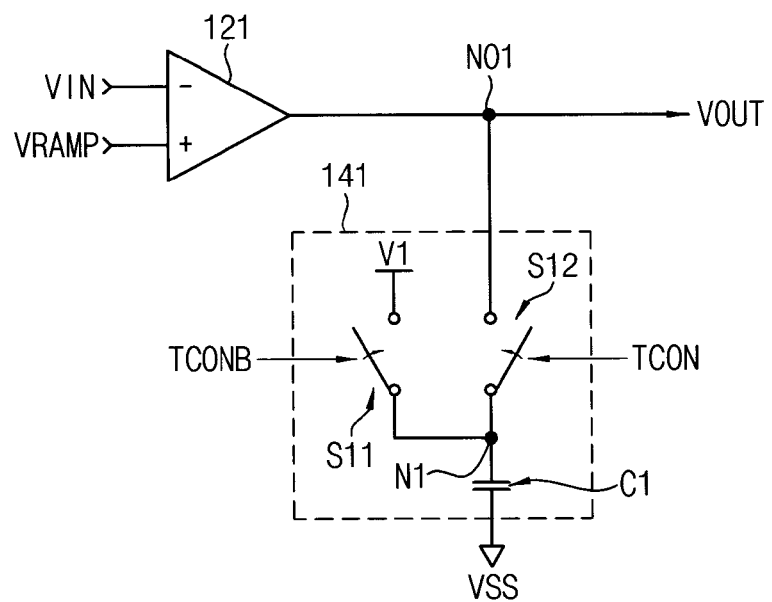
FIG. 2 is a circuit diagram illustrating the CDS circuit of FIG. 1, according to an exemplary embodiment.

FIG. 2 is a circuit diagram illustrating the CDS circuit 100 of FIG. 1, according to an exemplary embodiment. More particularly, FIG. 2 illustrates an illustrative configuration in which the sampling unit of a CDS circuit includes one comparison unit and the TCBL unit includes one TCBL block.

Referring to FIG. 2, CDS circuit 100a includes a sampling unit, including a first comparison unit 121, and a TCBL unit, including TCBL block 141. The first comparison unit 121 generates an output signal VOUT by comparing a ramp signal VRAMP with an input signal VIN. Although not illustrated in FIG. 2, the first comparison unit 121 may include an operational transconductance amplifier (OTA), at least one capacitor, and at least one switch, for example. The TCBL block 141 is connected to an output terminal (e.g., first output node NO1) of the first comparison unit 121 to provide the output signal VOUT. In other words, the TCBL block 141 is connected to the end portion of the sampling unit.

In the depicted embodiment, the TCBL block 141 includes a capacitor C1, a first switch S11, and a second switch S12. The capacitor C1 is connected between a first node N1 and a ground voltage terminal, to which ground voltage VSS may be applied. In other words, the capacitor C1 includes a first electrode connected to the first node N1 and a second electrode connected to the ground voltage terminal. The first switch S11 is configured to selectively connect the first node N1 to a first voltage terminal based on an inverted signal TCONB of the timing control signal TCON, where the inverted signal TCONB is deactivated when the timing control signal TCON is activated, and the inverted signal TCONB is activated when the timing control signal TCON is deactivated. This enables first voltage V1 to be applied selectively to the first voltage terminal. The first voltage V1 may have a level substantially equal to a logic high level of the output signal VOUT. The level of the first voltage V1 may be determined depending on circuit design, or simulation and/or training operations. The second switch S12 is configured to selectively connect the first node N1 to the output terminal (e.g., the first output node NO1) of the first comparison unit 121 based on the timing control signal TCON.

The first comparison unit 121 may include an OTA (not illustrated), as mentioned above. Although the OTA performs a low pass filtering operation with respect to the input signal VIN, random noise may be caused even in the first comparison unit 121 as well as in a pixel to provide the input signal VIN. Accordingly, the random noise may not be entirely removed using the OTA. As will be described below with reference to FIG. 3, the TCBL block 141 may improve the effect of the lower pass filtering operation of the OTA using the capacitor C1, and may effectively reduce the random noise of the output signal VOUT.

Figure 3:
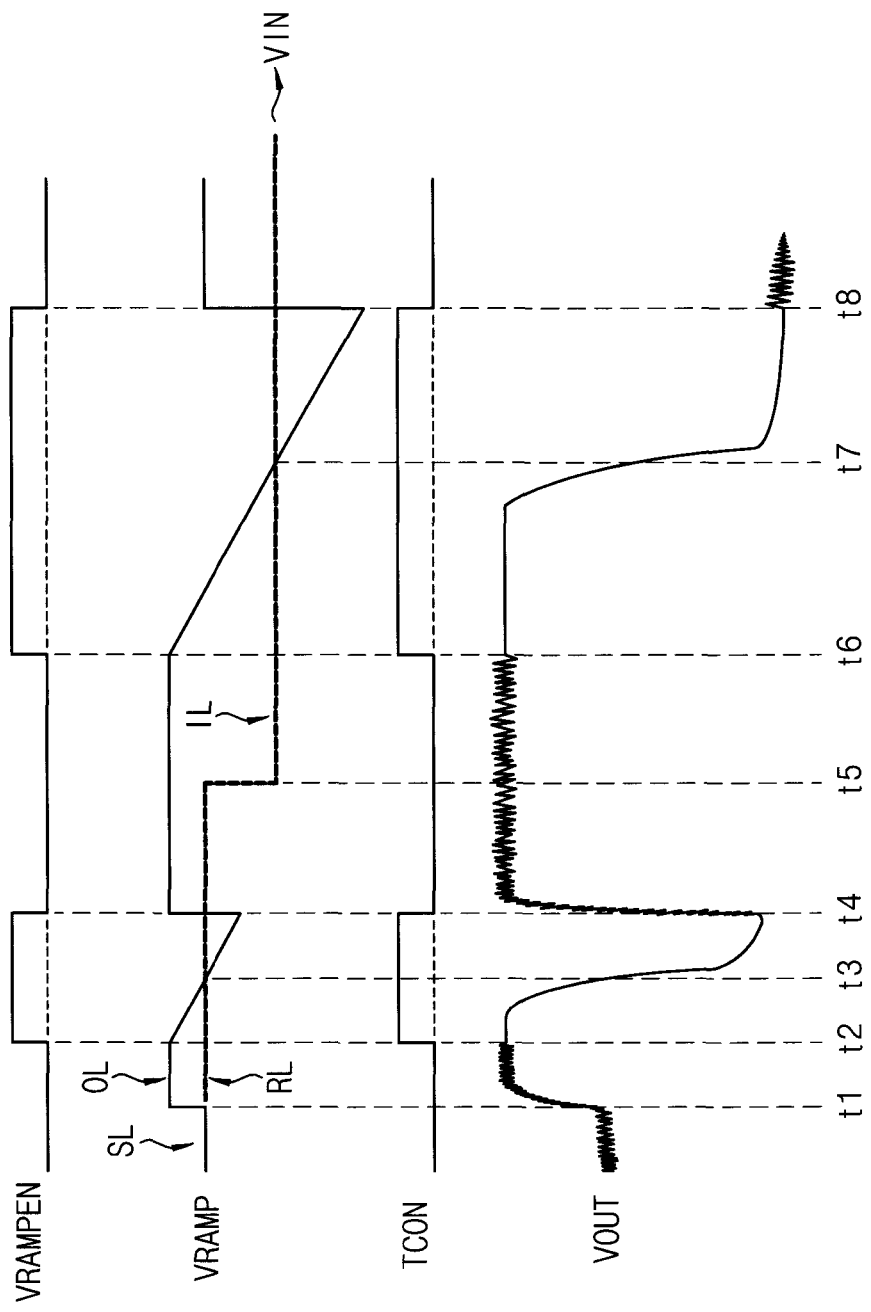
FIG. 3 is a timing diagram illustrating operation of the CDS circuit of FIG. 2, according to an exemplary embodiment.

FIG. 3 is a timing diagram for describing the operation of the CDS circuit 100a of FIG. 2, according to an exemplary embodiment. Hereinafter, the operation of the CDS circuit 100a will be described in more detail with reference to FIGS. 2 and 3.

Before time t1, the ramp signal VRAMP has a starting voltage level SL, and the input signal VIN has a reset level RL corresponding to the reset component. The starting voltage level SL may be substantially equal to the reset level RL. At time t1, the ramp signal VRAMP has an offset level OL obtained by increasing the starting voltage level SL by a predetermined offset value. The offset level OL may be greater than the reset level RL.

During a first pre-charge duration, which is from time t1 to time t2, the TCBL block 141 performs a first pre-charge operation based on the deactivated timing control signal TCON. In more detail, the first switch S11 is closed and the second switch S12 is opened, so that the first node N1 is electrically connected to the first voltage terminal to which the first voltage V1 is applied. Therefore, the capacitor C1 is pre-charged with the first voltage V1 having a voltage level substantially equal to the logic high level of the output signal VOUT. Since the level of the ramp signal VRAMP is greater than the level of the input signal VIN during the first pre-charge duration, the output signal VOUT has a logic high level. The waveform of the output signal VOUT is distorted due to random noise caused by the pixel and included in the input signal VIN, and random noise caused by operation of the first comparison unit 121.

At time t2, the timing control signal TCON is activated. In addition, a ramp enable signal VRAMPEN is activated, so that the ramp signal VRAMP is activated during the first comparison duration, which is from time t2 to time t4. The ramp enable signal VRAMPEN is applied to a voltage generator (e.g., voltage generator 244 in FIG. 8), which is located outside the CDS circuit 100a. The voltage generator may provide the ramp signal VRAMP based on the ramp enable signal VRAMPEN. Here, "a ramp enable signal VRAMPEN is activated" means that the ramp enable signal VRAMPEN transitions from the first logic level to the second logic level. In addition, "the ramp signal VRAMP is activated" means that the ramp signal VRAMP begins decreasing with a predetermined gradient from the offset level OL.

During the first comparison duration (time t2 to time t4), the TCBL block 141 performs the first noise removing operation with respect to the output signal VOUT based on the activated timing control signal TCON and the result of the first pre-charge operation. In detail, the first switch S11 is opened and the second switch S12 is closed, so that the first node N1 and the first output node NO1 are electrically connected to each other. Since the capacitor C1 has been pre-charged with the first voltage V1, the output signal VOUT may not be discretely generated even when the first node N1 is electrically connected to the first output node NO1 at the time t2. Since the level of the ramp signal VRAMP is greater than the level of the input signal VIN during the duration from time t2 to time t3, and since the level of the ramp signal VRAMP is lower than the level of the input signal VIN during the duration from time t3 to time t4, the output signal VOUT transitions from a logic high level to a logic low level at time t3. The performance of the low pass filtering operation for the output signal VOUT is improved by the capacitor C1, and the distortion of the waveform of the output signal VOUT is removed.

At time t4, each of the timing control signal TCON and the ramp enable signal VRAMPEN is deactivated. Accordingly, the ramp signal VRAMP is deactivated during the second pre-charge duration, which is from time t4 to time t6, and the ramp signal VRAMP returns to the offset level OL.

During the second pre-charge duration, the TCBL block 141 performs a second pre-charge operation based on the deactivated timing control signal TCON. In detail, the first switch S11 is closed and the second switch S12 is opened, so that the first node N1 and the first voltage terminal are electrically connected to each other, and the capacitor C1 is pre-charged with the first voltage V1. The output signal VOUT has a logic high level during the second pre-charge duration, and the waveform of the output signal VOUT is distorted due to random noise. Meanwhile, photo-charges, which are generated in a photoelectric conversion region of a pixel, are transferred at time t5, and the level of the input signal VIN changes from the reset level RL to an image level IL corresponding to the image component.

The timing control signal TCON is activated at time t6. In addition, the ramp enable signal VRAMPEN is activated, so that the ramp signal VRAMP is activated for the second comparison duration, which is from time t6 to time t8.

During the second comparison duration, the TCBL block 141 performs the second noise removing operation with respect to the output signal VOUT based on the activated timing control signal TCON and the result of the second pre-charge operation. In detail, the first switch S11 is opened and the second switch S12 is closed, so that the first node N1 and the first output node NO1 are electrically connected to each other. Since the level of the ramp signal VRAMP is greater than the level of the input signal VIN during the duration from time t6 to time t7, and the level of the ramp signal VRAMP is lower than the level of the input signal VIN during the duration from time t7 to time t8, the output signal VOUT transitions from the logic high level to the logic low level at time t7. The performance of the low pass filtering operation for the output signal VOUT is improved by the capacitor C1, and the distortion of the waveform of the output signal VOUT is removed.

As illustrated in FIG. 3, a first duration, from a starting time point (e.g., time t2) of the first comparison duration to an intermediate time point (e.g., time t3) of the first comparison duration (at which the ramp signal VRAMP has a value equal to that of the input signal VIN) corresponds to the reset component of the input signal VIN. A second duration, from a starting time point (e.g., time t6) of the second comparison duration to an intermediate time point (e.g., time t7) of the second comparison duration (at which the ramp signal VRMP has a value equal to that of the input signal VIN) corresponds to the image component of the input signal VIN. The image sensor including the CDS circuit 100 according to exemplary embodiments may generate an effective digital signal based on the first and second durations, which will be described below with reference to FIG. 10.

As described above, the TCBL block 141 performs the pre-charge operations and the noise removing operations based on the timing control signal TCON. Therefore, the random noise of the output signal VOUT corresponding to the reset component and the image component of the input signal VIN can be effectively reduced.

Figure 4:
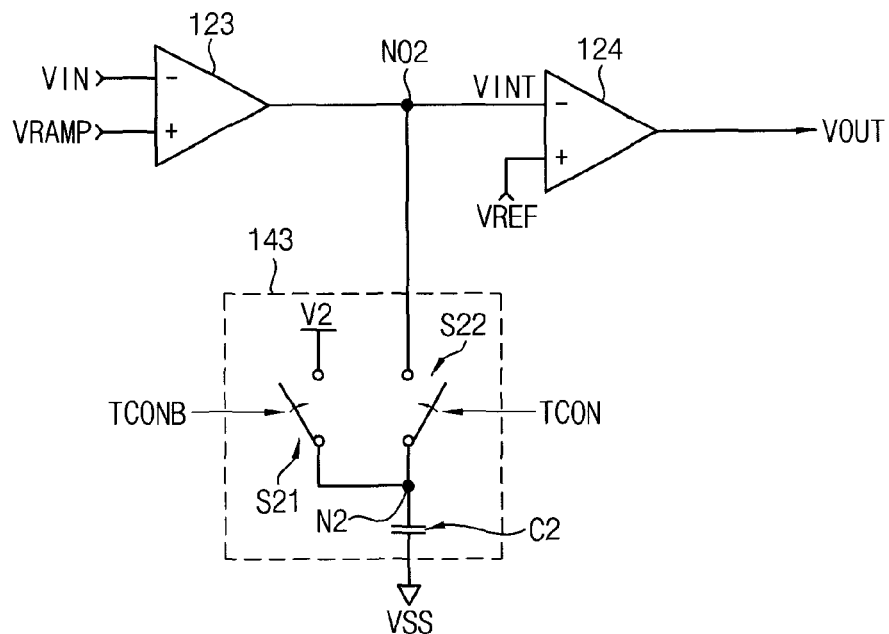
FIGS. 4, 5, and 6 are circuit diagrams illustrating various CDS circuits of FIG. 1, according to exemplary embodiments.
Figure 5:
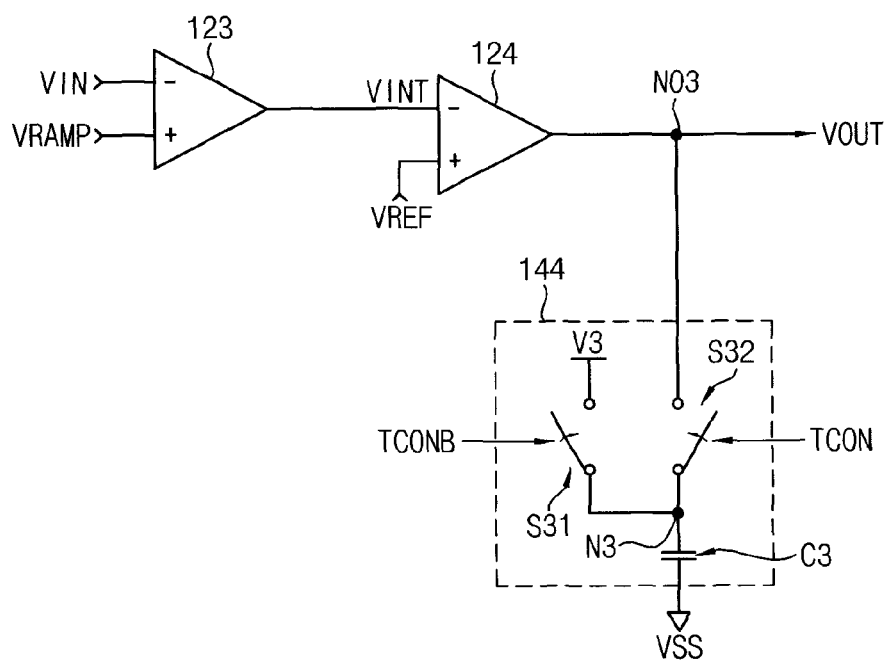
Figure 6:
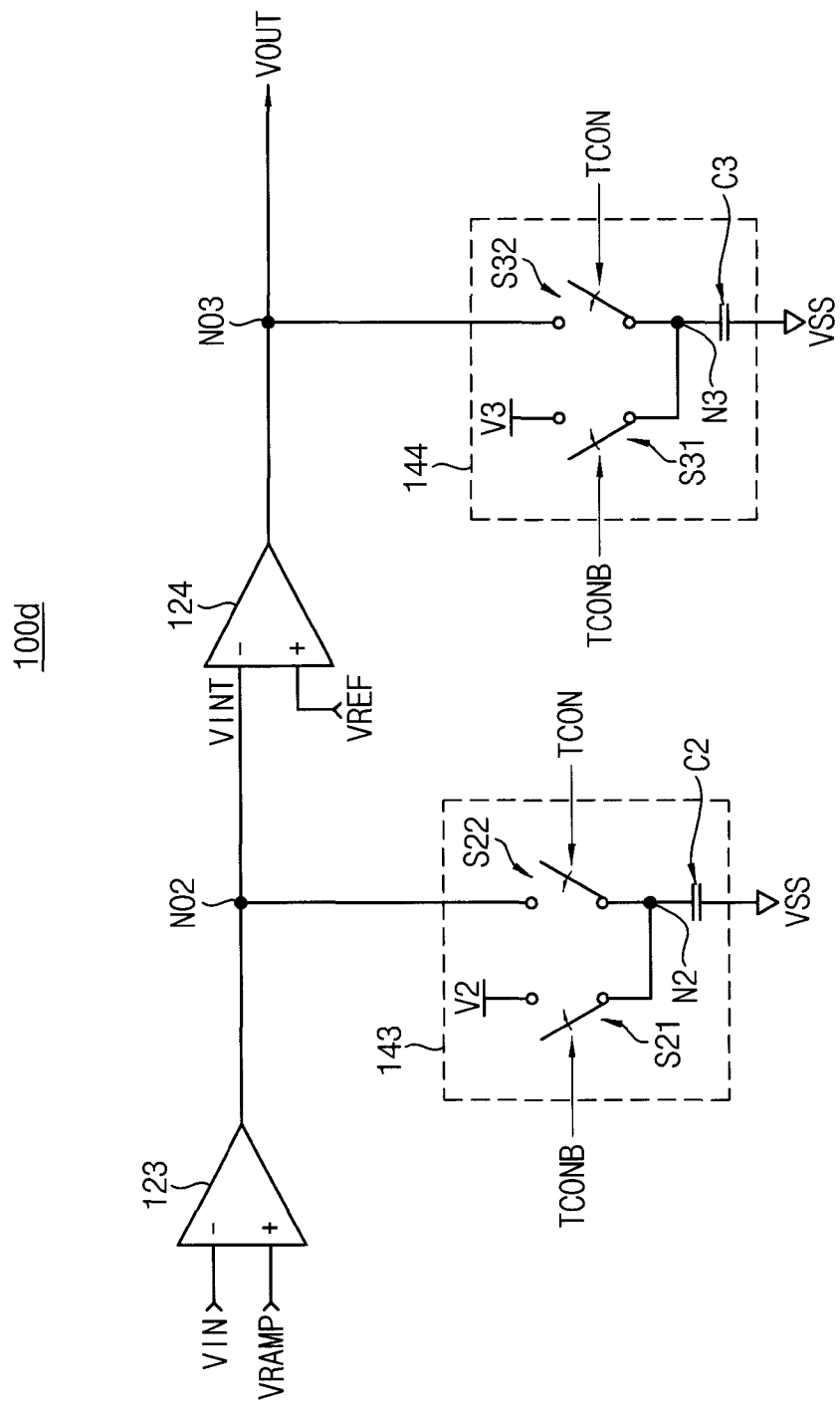

FIGS. 4, 5, and 6 are circuit diagrams illustrating other examples of the CDS circuit of FIG. 1, according to various exemplary embodiments. FIGS. 4, 5, and 6 illustrate configurations in which the sampling unit of the CDS circuit includes two comparison units, respectively.

Referring to FIG. 4, CDS circuit 100b includes a sampling unit, including a first comparison unit 123 and a second comparison unit 124, and a TCBL unit, including a TCBL block 143. The first comparison unit 123 compares a ramp signal VRAMP with an input signal VIN to generate an intermediate signal VINT. The second comparison unit 124 compares the intermediate signal VINT with a reference signal VREF to generate an output signal VOUT. Although not illustrated in FIG. 4, each of the first and second comparison units 123 and 124 may include an OTA, at least one capacitor, and at least one switch, for example.

The TCBL block 143 is connected to an output terminal (e.g., second output node NO2) of the first comparison unit 123 to provide the intermediate signal VINT. In other words, the TCBL block 143 is connected to the intermediate portion of the sampling unit. The TCBL block 143 may have a structure similar to that of the TCBL block 141 of FIG. 2, and may include a capacitor C2, a first switch S21, and a second switch S22, for example. That is, the capacitor C2 is connected between a second node N2 and a ground voltage terminal, to which a ground voltage VSS is applied. The first switch S21 is configured to selectively connect the second node N2 to a second voltage terminal, to which a second voltage V2 is applied, based on an inverted signal TCONB of a timing control signal TCON. The second voltage V2 may have a level substantially equal to a logic high level of the intermediate signal VINT. The second switch S22 is configured to selectively connect the second node N2 to the output terminal (e.g., the second output node NO2) of the first comparison unit 123 based on the timing control signal TCON.

The CDS circuit 100b of FIG. 4 has a similar structure to that of the CDS circuit 100a in FIG. 2, except that the sampling unit includes two comparison units (e.g., two OTAs) to increase the gain of the output signal VOUT, and the TCBL block 143 is connected to the intermediate portion of the sampling unit. Accordingly, as described above with reference to FIGS. 2 and 3, the TCBL block 143 included in the CDS circuit 100b of FIG. 4 effectively reduces random noise of the output signal VOUT by performing the pre-charge operations and the noise removing operations based on the timing control signal TCON.

Referring to FIG. 5, CDS circuit 100c includes a sampling unit, including a first comparison unit 123 and a second comparison unit 124, and a TCBL unit, including a TCBL block 144. The first and second comparison units 123 and 124 may be the substantially same as the first and second comparison units 123 and 124 in FIG. 4. In the depicted embodiment, the TCBL block 144 is connected to an output terminal (e.g., a third output node NO3) of the second comparison unit 124 to provide an output signal VOUT. In other words, the TCBL block 144 is connected to an end portion of the sampling unit. The TCBL block 144 may have a structure similar to that of the TCBL block 141 of FIG. 2, and may include a capacitor C3, a first switch S31, and a second switch S32, for example.

The capacitor C3 is connected between a third node N3 and a ground voltage terminal, to which a ground voltage VSS is applied. The first switch S31 is configured to selectively connect the third node N3 to a third voltage terminal, to which a third voltage V3 is applied, based on an inverted signal TCONB of a timing control signal TCON. The third voltage V3 may have a voltage level substantially equal to a logic high level of the output signal VOUT. The second switch S32 is configured to selectively connect the third node N3 to the output terminal (e.g., the third output node NO3) of the second comparison unit 124, based on the timing control signal TCON.

The CDS circuit 100c of FIG. 5 has a similar structure to that of the CDS circuit 100a of FIG. 2, except that the sampling unit includes two comparison units (e.g., two OTAs) to increase the gain of the output signal VOUT, and the TCBL block 144 is connected to the end portion of the sampling unit. Accordingly, the TCBL block 144 of FIG. 5 effectively reduces random noise of the output signal VOUT by performing the pre-charge operations and the noise removing operations based on the timing control signal TCON.

Referring to FIG. 6, CDS circuit 100d includes a sampling unit, including a first comparison unit 123 and a second comparison unit 124, and a TCBL unit, including a first TCBL block 143 and a second TCBL block 144. The first and second comparison units 123 and 124 may be the substantially same as the first and second comparison units 123 and 124 in FIG. 4. The first TCBL block 143 is connected to the output terminal of the first comparison unit 123 to provide the intermediate signal VINT, and the second TCBL block 144 is connected to the output terminal of the second comparison unit 124 to provide the output signal VOUT. In other words, the TCBL unit is connected to both the intermediate portion and the end portion of the sampling unit. The first TCBL block 143 may be substantially same as the TCBL block 143 in FIG. 4, and the second TCBL block 144 may be substantially same as the TCBL block 144 in FIG. 5.

The CDS circuit 100d of FIG. 6 has a similar structure to that of the CDS circuit 100a of FIG. 2, except that the CDS circuit 100d of FIG. 6 includes two comparison units (e.g., two OTAs) and two TCBL blocks. Accordingly, the TCBL blocks 143 and 144 in FIG. 6 effectively reduce random noise of the output signal VOUT by performing the pre-charge operations and the noise removing operations based on the timing control signal TCON.

Figure 7:
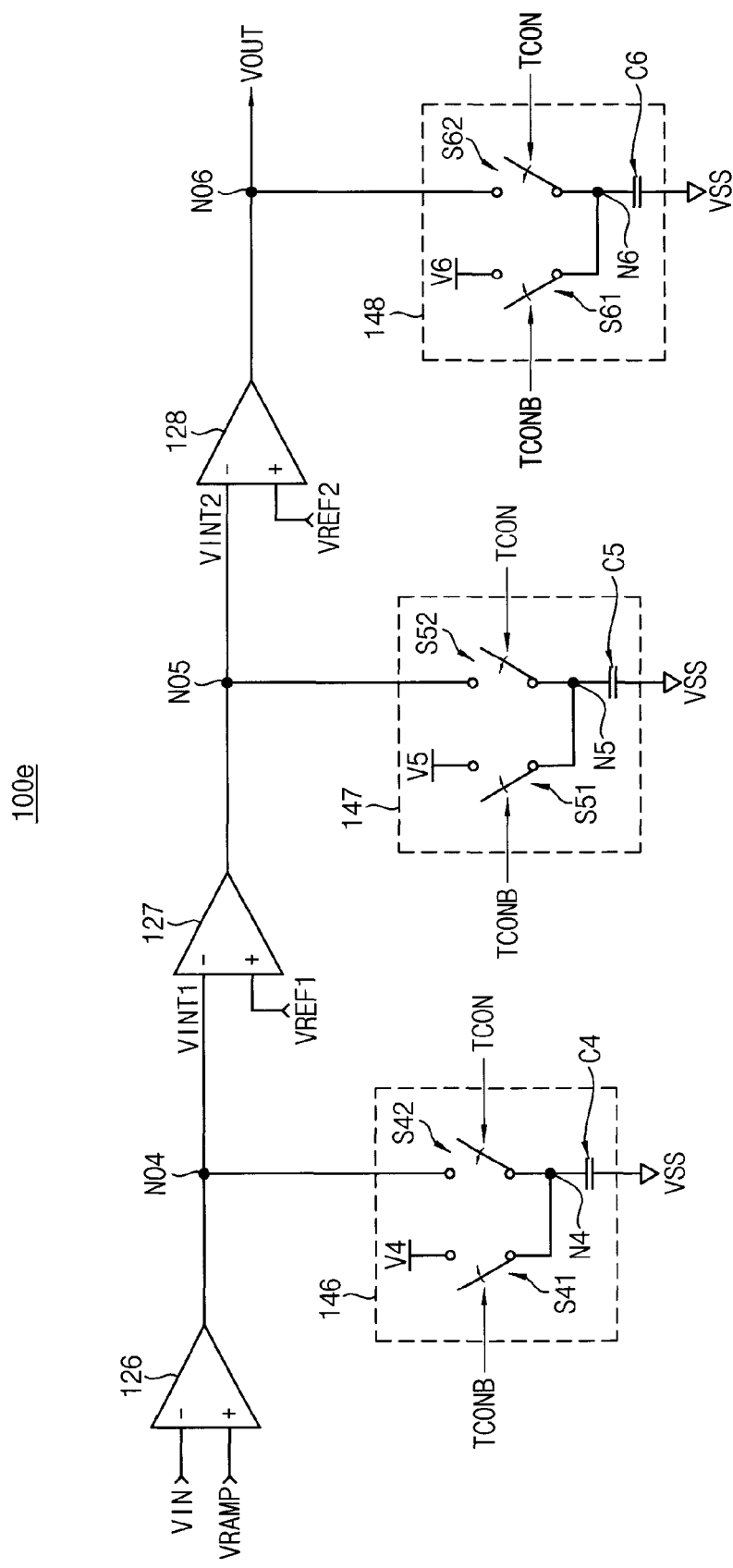
FIG. 7 is a circuit diagram illustrating still another CDS circuit of FIG. 1, according to an exemplary embodiment.

FIG. 7 is a circuit diagram illustrating still another example of the CDS circuit of FIG. 1, according to an exemplary embodiment. FIG. 7 illustrates a configuration in which a sampling unit of the correlated double sampling circuit includes three comparison units, and a TCBL unit of the correlated double sampling circuit includes three TCBL blocks.

Referring to FIG. 7, CDS circuit 100e includes a sampling unit, including a first comparison unit 126, a second comparison unit 127 and a third comparison unit 128, and a TCBL unit, including a first TCBL block 146, a second TCBL block 147 and a third TCBL block 148.

The first comparison unit 126 is configured to compare a ramp signal VRAMP to an input signal VIN to generate a first intermediate signal VINT1. The second comparison unit 127 is configured to compare the first intermediate signal VINT1 to a first reference signal VREF1 to generate a second intermediate signal VINT2. The third comparison unit 128 is configured to compare the second intermediate signal VINT2 to a second reference signal VREF2 to generate an output signal VOUT. Although not illustrated in FIG. 7, each of the first, second and third comparison units 126, 127, and 128 may include one OTA, at least one capacitor, and at least one switch, for example.

The first TCBL block 146 is connected to an output terminal (e.g., fourth output node NO4) of the first comparison unit 126 to provide the first intermediate signal VINT1. The second TCBL block 147 is connected to an output terminal (e.g., fifth output node NO5) of the second comparison unit 127 to provide the second intermediate signal VINT2. The third TCBL block 148 is connected to an output terminal (e.g., sixth output node NO6) of the third comparison unit 128 to provide the output signal VOUT.

Each of the first, second and third TCBL blocks 146, 147 and 148 may have a structure similar to that of the TCBL block 141 in FIG. 2. The first TCBL block 146 includes a capacitor C4 connected between a fourth node N4 and a ground voltage terminal to which a ground voltage VSS is applied, a first switch S41 selectively connecting the fourth node N4 to a fourth voltage terminal to which a fourth voltage V4 is applied, based on an inverted timing control signal TCONB, and a second switch S42 selectively connecting the fourth node N4 to the output terminal (e.g., fourth output node NO4) of the first comparison unit 126 based on a timing control signal TCON. The second TCBL block 147 includes a capacitor C5 connected between a fifth node N5 and the ground voltage terminal, a first switch S51 selectively connecting the fifth node N5 to a fifth voltage terminal to which a fifth voltage V5 is applied, based on the inverted timing control signal TCONB, and a second switch S52 selectively connecting the fifth node N5 to the output terminal (e.g., fifth output node NO5) of the second comparison unit 127 based on the timing control signal TCON. The third TCBL block 148 includes a capacitor C6 connected between a sixth node N6 and the ground voltage terminal VSS, a first switch S61 selectively connecting the sixth node N6 to a sixth voltage terminal to which a sixth voltage V6 is applied, based on the inverted timing control signal TCONB, and a second switch S62 selectively connecting the sixth node N6 to an output terminal of the third comparison unit 128 based on the timing control signal TCON. The fourth voltage V4 may have a level substantially equal to a logic high level of the first intermediate signal VINT1, the fifth voltage V5 may have a level substantially equal to a logic high level of the second intermediate signal VINT2, and the sixth voltage V6 may have a level substantially equal to a logic high level of the output signal VOUT.

The CDS circuit 100e of FIG. 7 has a similar structure to that of the CDS circuit 100a of FIG. 2, except that the CDS circuit 100e of FIG. 7 includes three comparison units and three TCBL blocks. Accordingly, the TCBL blocks 146, 147, and 148 in FIG. 7 effectively reduce random noise of the output signal VOUT by performing the pre-charge operations and the noise removing operations based on the timing control signal TCON.

Generally, in various configurations, when the sampling unit included in the CDS circuit has three comparison units, as illustrated in FIG. 7, the TCBL unit may include at least one TCBL block connected to the end portion and/or the intermediate portions of the sampling unit. For example, the TCBL unit may include only one or two of the first, second and third TCBL blocks 146, 147, and 148 in FIG. 7. In other words, the CDS circuit according to exemplary embodiments may include a sampling unit including multiple comparison units sequentially connected to each other and a TCBL unit including at least one TCBL block connected to the end portion and/or one or more intermediate portions of the sampling unit.

Although not illustrated in FIGS. 2, 4, 5, 6 and 7, the CDS circuit according to various alternative exemplary embodiments may include a sampling unit (having one or more comparison units) and a TCBL unit connected to the front portion (e.g., an input terminal to receive the input signal) of the sampling unit. In this case, the TCBL unit connected to the front portion of the sampling unit can effectively reduce random noise of the output signal by performing a pre-charge operation and a noise removing operation based on a timing control signal corresponding to the reception timing of the input signal.

Figure 8:
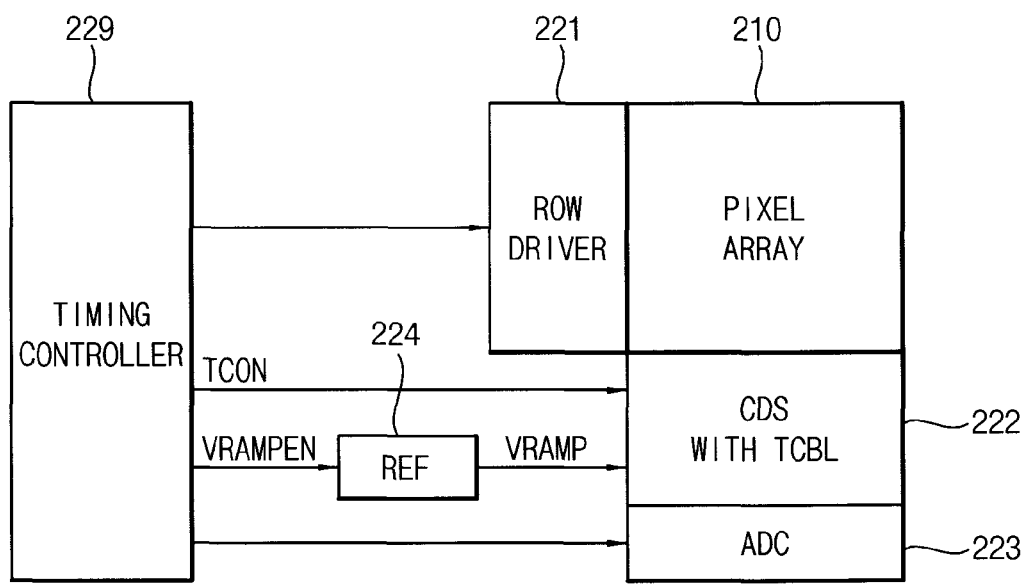
FIG. 8 is a block diagram illustrating an image sensor including the CDS circuit, according to exemplary embodiments.

FIG. 8 is a block diagram illustrating an image sensor including the CDS circuit, according to exemplary embodiments.

Referring to FIG. 8, an image sensor 200 includes a pixel array 210, a correlated double sampling (CDS) unit 222, and an analog-to-digital converting (ADC) unit 223. The image sensor 200 may further include a row driver 221, a voltage generator 224, and a timing controller 229.

The pixel array 210 includes multiple unit pixels, which detect incident light and respectively generate pixel signals corresponding to the incident light. The unit pixels may be arranged in the form of a matrix having multiple rows and multiple columns.

Figure 9:
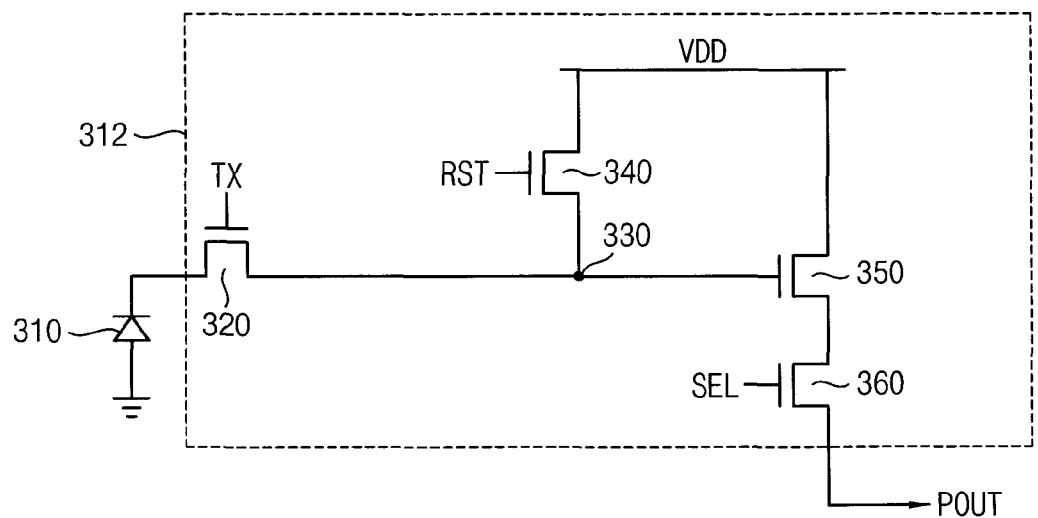
FIG. 9 is a circuit diagram illustrating a unit pixel included in the image sensor of FIG. 8, according to an exemplary embodiment.

FIG. 9 is a circuit diagram illustrating a unit pixel included in the image sensor of FIG. 8, according to an exemplary embodiment.

Referring to FIG. 9, a unit pixel 300 includes a photoelectric converting unit 310 and a signal generating circuit 312.

The photoelectric converting unit 310 performs photoelectric conversion. For example, the photoelectric converting unit 310 converts incident light into photo-charges during an integration mode. When an image sensor including the unit pixel 300 is a CMOS image sensor, for example, image information of an object to be captured is obtained by collecting charge carriers (e.g., electron-hole pairs) in the photoelectric converting unit 310 proportional to intensity of the incident light through an open shutter of the CMOS image sensor, during the integration mode.

The signal generating circuit 312 generates a pixel signal POUT based on the photo-charges generated by the photoelectric conversion during a readout mode. When the image sensor including the unit pixel 300 is a CMOS image sensor, for example, the shutter is closed, the image information in the form of charge carriers is converted into the electric signals, and the pixel signal POUT is generated based on the electric signals, during the readout mode after the integration mode.

The unit pixel 300 may have various structures including, for example, a one-transistor structure, a three-transistor structure, a four-transistor structure, a five-transistor structure, a structure in which some transistors are shared by multiple unit pixels, etc. FIG. 9 illustrates the four-transistor structure, according to an exemplary embodiment, for purposes of discussion. The signal generating circuit 312 therefore includes a transfer transistor 320, a reset transistor 340, a drive transistor 350, and a selective transistor 360. The signal generating circuit 312 also includes a floating diffusion (FD) node 330.

The transfer transistor 320 includes a first electrode connected to the photoelectric converting unit 310, a second electrode connected to the FD node 330, and a gate electrode to which a transfer signal TX is applied. The reset transistor 340 includes a first electrode to which a power supply voltage VDD is applied, a second electrode connected to the FD node 330, and a gate electrode is which a reset signal RST is applied. The drive transistor 350 includes a first terminal to which the power supply voltage VDD is applied, a gate electrode connected to the FD node 330, and a second electrode connected to the selective transistor 360. The selective transistor 360 includes a first electrode connected to the second electrode of the drive transistor 350, a gate electrode to which a select signal SEL is applied, and a second electrode from which the pixel signal POUT is output.

Referring back to FIG. 8, the row driver 221, the CDS unit 222, the ADC unit 223, the voltage generator 224, and the timing controller 229 may form a signal processing unit of the image sensor 200. The signal processing unit may generate digital signals by processing the analog pixel signals (e.g., the pixel signal POUT in FIG. 9).

The row driver 221 is connected to each row of the pixel array 210. The row driver 221 provides driving signals to drive each row. For example, the row driver 221 may drive multiple unit pixels included in the pixel array 210 in the unit of a row.

The CDS unit 222 generates sampling signals by performing a CDS operation with respect to the pixel signals. For example, the CDS unit 222 may perform the CDS operation by obtaining the difference between a voltage level representing a reset component of each pixel signal and a voltage level representing an image component of each pixel signal, and may output the sampling signals corresponding to effective signal components. The CDS unit 222 may include multiple CDS circuits connected to each column line of the pixel array 210, and may output the sampling signals corresponding to the effective signal components in the unit of a column.

Each CDS circuit included in the CDS unit 222 may be the CDS circuit 100 in FIG. 1, and may have one of the structures described above with reference to FIGS. 2, 4, 5, 6 and 7. That is, each CDS circuit includes a sampling unit (including one or more comparison units) and a TCBL unit (including one or more TCBL blocks). The sampling unit generates a first sampling signal among the sampling signals by performing the CDS operation with respect to reset and image components of a first pixel signal among the pixel signals based on a ramp signal VRAMP. The TCBL unit is connected to the sampling unit, and removes noise from the first sampling signal based on the timing control signal TCON activated during the first comparison duration such that a first comparison operation with respect to the ramp signal VRAMP and the reset component of the first pixel signal is performed, and during the second comparison duration such that a second comparison operation with respect to the ramp signal VRAMP and the image component of the first pixel signal is performed. The TCBL unit may be connected to the end portion and/or intermediate portions of the sampling unit. Also, the TCBL unit may be implemented with a relatively simple structure including a capacitor and a switch, and may perform a pre-charge operation and a noise removing operation based on the timing control signal TCON, thereby effectively reducing random noise without increasing the size of the image sensor 200.

The ADC unit 223 generates the digital signals by converting the analog sampling signals corresponding to the effective signal components. Although not illustrated in FIG. 8, the ADC unit 223 may include a counter and a buffer unit. The counter is configured to generate counting signals by performing a counting operation with respect to reset and image components of the pixel signals, and to provide the counting signals to the buffer unit. The buffer unit may include multiple latch circuits connected to the column lines, respectively, and is configured to latch the counting signals in the unit of a column, and to output the latched counting signals as the digital signals.

The voltage generator 224 is configured to generate the ramp signal VRAMP based on the ramp enable signal VRAMPEN. When each CDS circuit has the structure described above with reference FIGS. 4, 5, 6, and 7, for example, the voltage generator 224 may additionally generate reference signals VREF, VREF1 and/or VREF2.

The timing controller 229 controls the operations (e.g., operating timings) of the row driver 221, the CDS unit 222, the ADC unit 223, and the voltage generator 224. The timing controller 229 is configured to generate the timing control signal TCON and the ramp enable signal VRAMPEN.

Although not illustrated in FIG. 8, the image sensor 200 may further include a digital signal processing unit to output an image signal by performing digital signal processing operations on the digital signals.

Figure 10:
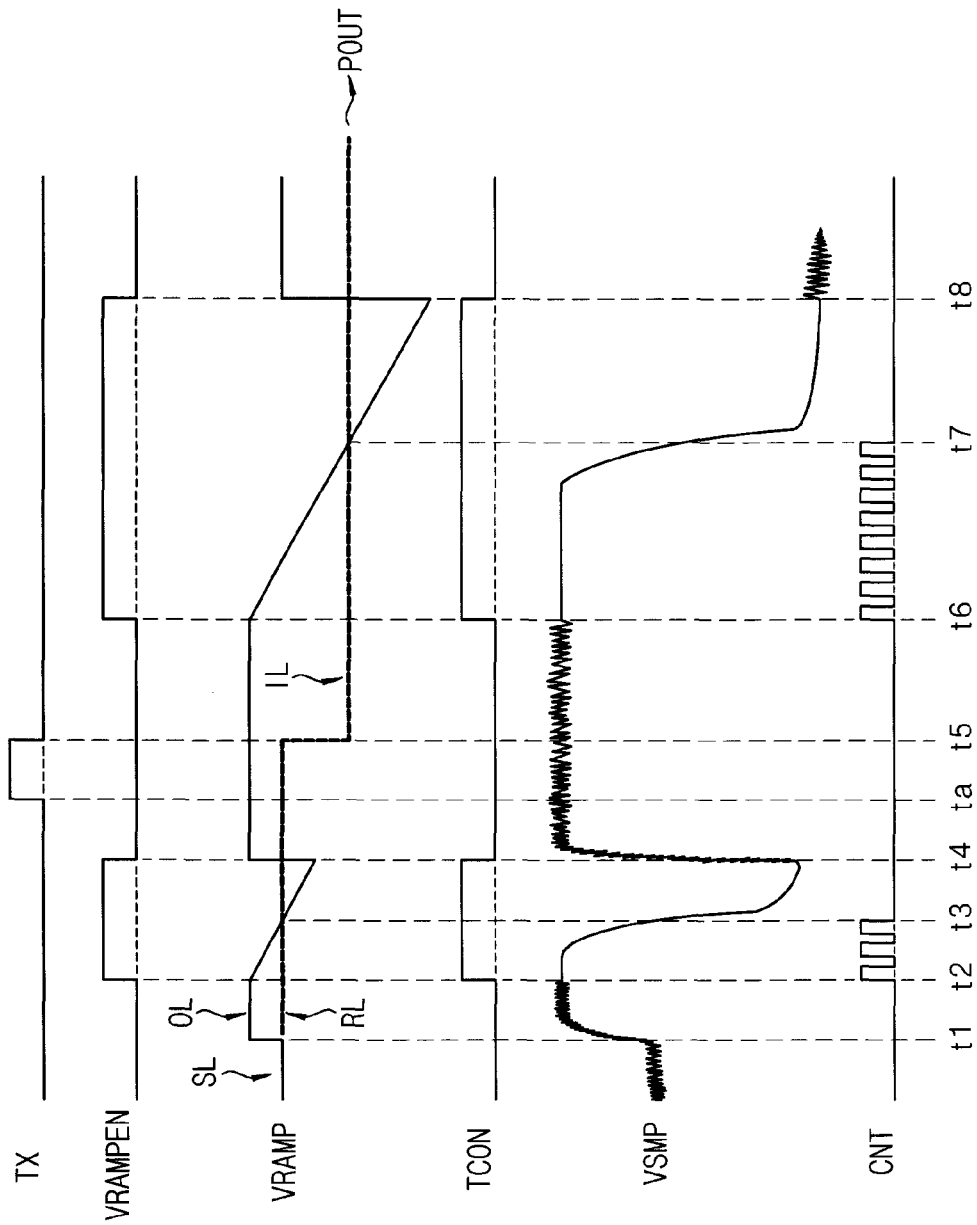
FIG. 10 is a timing diagram for describing the operation of the image sensor of FIG. 8, according to an exemplary embodiment.

FIG. 10 is a timing diagram for describing operation of the image sensor in FIG. 8, according to an exemplary embodiment. Hereinafter, the operation of the image sensor 200 according to exemplary embodiments will be described in more detail with reference to FIGS. 8, 9, and 10.

When external light is incident onto the photoelectric converting unit 310 during the integration mode, electron-hole pairs are generated in proportion to the intensity of the light. When the reset signal RST is activated during the readout mode after the integration mode, the reset transistor 340 is turned on, and the electric potential of the FD node 330, serving as a sensing node, is reset to the power supply voltage VDD. The pixel signal POUT output from the unit pixel 300 has the reset level RL corresponding to the reset state of the FD node 330, and the ramp signal VRAMP has the starting voltage level SL substantially equal to the reset level RL.

The ramp signal VRAMP has an offset level OL at time t1. The TCBL unit included in the CDS unit 222 performs the first pre-charge operation during first pre-charge duration, which is from time t1 to time t2. Since the level of the ramp signal VRAMP is greater than the level of the pixel signal POUT, the sampling signal VSMP output from the CDS unit 222 has a logic high level, and the waveform of the sampling signal VSMP is distorted due to the random noise.

The timing control signal TCON and the ramp enable signal VRAMPEN are activated at time t2. Accordingly, the ramp signal VRAMP is activated during the first comparison duration, which is from time t2 to t4, and the TCBL unit performs the first noise removing operation with respect to the sampling signal VSMP. The sampling signal VSMP transitions from a logic high level to a logic low level at time t3, which corresponds to the time at which the ramp signal VRAMP crosses the pixel signal POUT. The distortion of the waveform of the sampling signal VSMP is removed by the first noise removing operation. The counter included in the ADC unit 223 performs a first counting operation during a first duration from time t2 to time t3 corresponding to the reset component RL of the pixel signal POUT and generates the counting signal CNT.

At time t4, the timing control signal TCON and the ramp enable signal VRAMPEN are deactivated. Accordingly, the ramp signal VRAMP is deactivated during the second pre-charge duration, which is from time t4 to time t6, and the TCBL unit performs the second pre-charge operation. Meanwhile, when the transfer transistor 320 is turned on by activating the transfer signal TX at time ta, the charges collected in the photoelectric converting unit 310 are transferred to the FD node 330. When the transfer signal TX is deactivated and the charges have been completely transferred at time t5, the pixel signal POUT has an image level IL corresponding to the incident light.

The timing control signal TCON and the ramp enable signal VRAMPEN are activated at time t6. Accordingly, the ramp signal VRAMP is activated during the second comparison duration, which is from time t6 to time t8, and the TCBL unit performs the second noise removing operation with respect to the sampling signal VSMP. The sampling signal VSMP transitions from a logic high level to a logic low level at time t7, at which the ramp signal VRAMP crosses the pixel signal POUT. The distortion of the waveform of the sampling signal VSMP is removed by the second noise removing operation. The counter performs a second counting operation during a second duration from time t6 to time t7 corresponding to the image component IL of the pixel signal POUT, and generates the counting signal CNT. The ADC 224 generates the digital signal corresponding to the effective signal component by subtracting the counting number obtained during the first duration from the counting number obtained during the second duration.

The first and second pre-charge operations and the first and second noise removing operations may be substantially the same as the pre-charge operations and the noise removing operations described above with reference to FIG. 3, respectively.

Figure 11:
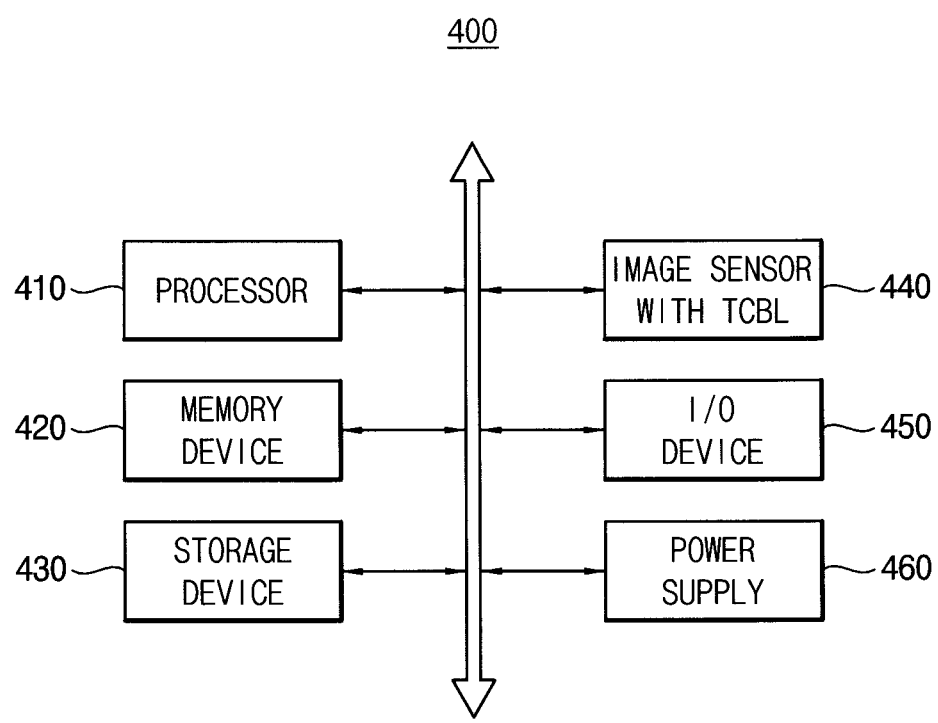
FIG. 11 is a block diagram illustrating a computing system, according to exemplary embodiments.

FIG. 11 is a block diagram illustrating a computing system, according to exemplary embodiments.

Referring to FIG. 11, a computing system 400 includes a processor 410, a memory device 420, a storage device 430, an image sensor 440, an input/output (I/O) device 450 and a power supply 460. Although not illustrated in FIG. 11, the computing system 400 may further include ports and/or interfaces used to communicate with a video card, a sound card, a memory card, or a USB device, or to communicate with other electronic systems.

The processor 410 may perform specific computations or specific tasks. According to exemplary embodiments, the processor 410 may include a microprocessor or a central processing unit (CPU). The processor 410 may be connected to the memory device 420, the storage device 430, and the I/O device 450 through an address bus, a control bus, and a data bus in order to communicate with the memory device 420, the storage device 430, and the input/output device 450. According to exemplary embodiments, the processor 410 may be connected to an expansion bus, such as a peripheral component interconnect (PCI) bus.

The memory device 420 may store data required for operation of the computing system 400. For example, the memory device 420 may include a volatile memory device, such as a dynamic random access memory (DRAM), a static random access memory (SRAM), etc., and a non-volatile memory device, such as an erasable programmable read-only memory (EPROM), an electrically erasable programmable read-only memory (EEPROM), a flash memory device, etc.

The storage device 430 may include a solid state drive (SSD), a hard disk drive (HDD), a CD-ROM, etc. The I/O device 450 may include one or more input units, such as a keyboard, a key pad, a mouse, etc., and one or more output units, such as a printer, a display device, etc. The power supply 460 may provide a power supply voltage required for operation of the computing system 400.

The image sensor 440 is connected to the processor 410 through one or more of the above buses or other communication links to communicate with the processor 410. The image sensor 440 may include the image sensor 200 of FIG. 8, for example, and one or more CDS circuits described with reference to FIGS. 1, 2, 4, 5, 6, and 7. For example, each of the CDS circuits of the image sensor 440 may include a sampling unit and a TCBL unit connected to an end portion and/or one or more intermediate portions of the sampling unit. The TCBL unit may be implemented with a relatively simple structure including capacitors and switches. The image sensor 440 performs the pre-charge operation and the noise removing operation based on the timing control signal, thereby effectively reducing random noise without increasing the size of the image sensor 440.

According to exemplary embodiments, the computing system 400 and/or components of the computing system 400 may be packaged in various forms, such as a package on package (PoP), ball grid arrays (BGAs), chip scale packages (CSPs), a plastic leaded chip carrier (PLCC), a plastic dual in-line package (PDIP), a die in waffle pack, a die in wafer form, a chip on board (COB), a ceramic dual in-line package (CERDIP), a plastic metric quad flat pack (MQFP), a thin quad flatpack (TQFP), a small outline (SOIC), a shrink small outline package (SSOP), a thin small outline (TSOP), a thin quad flatpack (TQFP), a system in package (SIP), a multi chip package (MCP), a wafer-level fabricated package (WFP), or a wafer-level processed stack package (WSP).

In exemplary embodiments, the image sensor 440 and the processor 410 may be fabricated as one integrated circuit chip. In exemplary embodiments, the image sensor 440 and the processor 410 may be fabricated as two separate integrated circuit chips.

FIG. 12 is a block diagram illustrating an example of an interface used in the computing system of FIG. 11, according to an exemplary embodiment.

Referring to FIG. 12, a computing system 1000 may be implemented by a data processing unit (e.g., mobile phone, personal digital assistants (PDA), portable multimedia player (PMP) or smart phone) to employ or support a mobile industry processor interface (MIPI) interface. In the depicted embodiment, the computing system 1000 includes an application processor 1110, an image sensor 1140, and a display device 1150.

A CSI host 1112 of the application processor 1110 may be in serial-communication with a CSI device 1141 of the image sensor 1140 through a camera serial interface (CSI). According to exemplary embodiments, the CSI host 1112 may include an optical deserializer (DES), and the CSI device 1141 may include an optical serializer (SER). A DSI host 1111 of the application processor 1110 may be in serial-communication with a DSI device 1151 of the display device 1150 through a display serial interface (DSI). According to exemplary embodiments, the DSI host 1111 may include an optical serializer (SER), and the DSI device 1151 may include an optical deserializer (DES).

The computing system 1000 further includes a radio frequency (RF) chip 1160 for communicating with the application processor 1110. A physical layer (PHY) 1113 of the application processor 1110 and a PHY 1161 of the RF chip 1160 may perform data communication with each other according to a MIPI DigRF. The application processor 1110 may further include a DigRF master 1114 for controlling data communication according to the MIPI DigRF of the PHY 1161. The RF chip 1160 further includes a DigRF slave 1162 controlled through the DigRF master 1114.

In the example, the computing system 1000 further includes a global positioning system (GPS) 1120, a storage 1170, a micro-phone 1180, a dynamic random access memory (DRAM) 1185, and a speaker 1190. In addition, the computing system 1000 may perform communication through an ultra wideband (UWB) 1210, a wireless local area network (WLAN) 1220, a worldwide interoperability for microwave access (WIMAX) 1230. However, the structure and interfaces of the computing system 1000 are provided for the illustrative purposes, and exemplary embodiments are not limited thereto.

The exemplary embodiments are applicable to image sensors provided with CDS circuits and electronic systems including the same. For example, the exemplary embodiments are applicable to computers, digital cameras, 3-D cameras, cellular phones, personal digital assistants (PDAs), scanners, navigation for a vehicle, video phones, surveillance systems, autofocus systems, tracking systems, motion detection systems, image stabilizing systems, and the like.

While the inventive concept has been described with reference to illustrative embodiments, it will be apparent to those skilled in the art that various changes and modifications may be made without departing from the spirit and scope of the present inventive concept. Therefore, it should be understood that the above embodiments are not limiting, but illustrative.

What is claimed is:

1. A correlated double sampling (CDS) circuit included in an image sensor, the CDS circuit comprising:

a sampling unit configured to generate an output signal by performing a CDS operation with respect to a reset component of an input signal and an image component of the input signal based on a ramp signal, the input signal being provided from a pixel array included in the image sensor; and a timing controlled band-limitation (TCBL) unit connected to the sampling unit, and configured to remove noise from the output signal based on a timing control signal, the timing control signal being activated during a first comparison duration, in which a first comparison operation is performed with respect to the ramp signal and the reset component of the input signal, and during a second comparison duration, in which a second comparison operation is performed with respect to the ramp signal and the image component of the input signal.

2. The CDS circuit of claim 1, wherein the TCBL unit is configured to perform a first pre-charge operation based on the timing control signal during a first pre-charge duration before the first comparison duration, to perform a first noise removing operation with respect to the output signal based on the timing control signal and a result of the first pre-charge operation during the first comparison duration, to perform a second pre-charge operation based on the timing control signal during a second pre-charge duration after the first comparison duration and before the second comparison duration, and to perform a second noise removing operation with respect to the output signal based on the timing control signal and a result of the second pre-charge operation during the second comparison duration.

3. The CDS circuit of claim 2, wherein a first duration, from a starting time point of the first comparison duration to an intermediate time point of the first comparison duration at which a value of the ramp signal equals a value of the input signal, corresponds to the reset component of the input signal, and wherein a second duration, from a starting time point of the second comparison duration to an intermediate time point of the second comparison duration at which a value of the ramp signal equals a value of the input signal, corresponds to the image component of the input signal.

4. The CDS circuit of claim 1, wherein the sampling unit comprises a first comparison unit configured to compare the ramp signal with the input signal to generate the output signal, and wherein the TCBL unit is connected to an output terminal of the first comparison unit to provide the output signal.

5. The CDS circuit of claim 4, wherein the TCBL unit comprises:

a capacitor connected between a ground voltage terminal and a first node;

a first switch configured to selectively connect the first node to a first voltage terminal, to which a first voltage having a voltage level substantially equal to a logic high level of the output signal is applied, based on an inverted signal of the timing control signal; and a second switch configured to selectively connect the first node with the output terminal of the first comparison unit based on the timing control signal.

6. The CDS circuit of claim 1, wherein the sampling unit comprises:

a first comparison unit configured to compare the ramp signal with the input signal to generate an intermediate signal; and a second comparison unit configured to compare the intermediate signal with a reference signal to generate the output signal.

7. The CDS circuit of claim 6, wherein the TCBL unit is connected to an output terminal of the first comparison unit to provide the intermediate signal.

8. The CDS circuit of claim 7, wherein the TCBL unit comprises:
a capacitor connected between a ground voltage terminal and a first node;
a first switch configured to selectively connect the first node with a first voltage terminal, to which a first voltage having a voltage level substantially equal to a logic high level of the intermediate signal is applied, based on an inverted signal of the timing control signal; and
a second switch configured to selectively connect the first node with the output terminal of the first comparison unit based on the timing control signal.

9. The CDS circuit of claim 6, wherein the TCBL unit is connected to an output terminal of the second comparison unit to provide the output signal.

10. The CDS circuit of claim 6, wherein the TCBL unit comprises:
a first TCBL block connected to an output terminal of the first comparison unit to provide the intermediate signal; and
a second TCBL block connected to an output terminal of the second comparison unit to provide the output signal.

11. The CDS circuit of claim 1, wherein the sampling unit comprises:
a first comparison unit configured to compare the ramp signal with the input signal to generate a first intermediate signal;
a second comparison unit configured to compare the first intermediate signal with a first reference signal to generate a second intermediate signal; and
a third comparison unit configured to compare the second intermediate signal with a second reference signal to generate the output signal.

12. The CDS circuit of claim 11, wherein the TCBL unit comprises at least one TCBL block, and the at least one TCBL block is connected to one of an output terminal of the first comparison unit to provide the first intermediate signal, an output terminal of the second comparison unit to provide the second intermediate signal, and an output terminal of the third comparison unit to provide the output signal.

13. An image sensor, comprising:
a pixel array comprising a plurality of unit pixels configured to detect incident light and to generate pixel signals respectively corresponding to the incident light;
a correlated double sampling (CDS) unit configured to generate sampling signals by performing a CDS operation with respect to the pixel signals; and
an analog-to-digital converting unit configured to convert the sampling signals into digital signals,
wherein the CDS unit comprises a plurality of CDS circuits connected to column lines of the pixel array, respectively, each CDS circuit, comprising:
a sampling unit configured to generate a first sampling signal among the sampling signals by performing the CDS operation with respect to reset and image components of a first pixel signal among the pixel signals based on a ramp signal; and
a timing controlled band-limitation (TCBL) unit connected to the sampling unit, and configured to remove noise from the first sampling signal based on a timing control signal, the timing control signal being activated during a first comparison duration to perform a first comparison operation with respect to the ramp signal and the reset component of the first pixel signal, and during a second comparison duration to perform a second comparison operation with respect to the ramp signal and the image component of the first pixel signal.

14. The image sensor of claim 13, further comprising:
a timing controller configured to control operations of the CDS unit and the analog-to-digital converting unit and to generate the timing control signal.

15. The image sensor of claim 13, further comprising:
a voltage generator configured to generate the ramp signal based on a ramp enable signal.

16. A correlated double sampling (CDS) circuit included in an image sensor, the CDS circuit comprising:
a sampling unit configured to generate an output signal in response to an input signal provided from a pixel array of the image sensor, the sampling unit comprising at least a first comparison unit configured to compare the input signal and a ramp signal; and
a timing controlled band-limitation (TCBL) unit connected to one of an end portion or an intermediate portion of the sampling unit,
wherein the TCBL unit is configured to remove noise from the output signal in response to a timing control signal during a first comparison duration, in which the first comparison unit performs a first comparison operation with respect to the ramp signal and a reset component of the input signal, and
wherein the TCBL unit is configured to remove noise from the output signal in response to the timing signal during a second comparison duration, in which the first comparison unit performs a second comparison operation with respect to the ramp signal and an image component of the input signal.

17. The CDS circuit of claim 16, wherein the TCBL unit comprises a first TCBL block connected to a first output node of the first comparison unit, the first TCBL block comprising:
a capacitor connected between a ground voltage terminal and a first node;
a first switch configured to selectively connect the first node to a first voltage terminal in response to activation of an inverted signal of the timing control signal, a first voltage being applied to the first voltage terminal, wherein the first voltage has a voltage level substantially equal to a logic high level of a signal at the first output node of the first comparison unit; and
a second switch configured to selectively connect the first node to the first output node of the first comparison unit in response to activation of the timing control signal.

18. The CDS circuit of claim 16, wherein the sampling unit further comprises a second comparison unit configured to compare a signal output by the first comparison unit and a reference signal for providing the output signal.

19. The CDS circuit of claim 18, wherein the TCBL unit further comprises a second TCBL block connected to a second output node of the second comparison unit, the second TCBL block comprising:
a capacitor connected between a ground voltage terminal and a second node;
a third switch configured to selectively connect the second node to a second voltage terminal in response to activation of an inverted signal of the timing control signal, a second voltage being applied to the second voltage terminal, wherein the second voltage has a voltage level substantially equal to a logic high level of a signal at the second output node of the second comparison unit; and
a fourth switch configured to selectively connect the second node to the second output node of the second comparison unit in response to activation of the timing control signal for removing noise from the output signal.

20. The CDS circuit of claim 17, wherein the first comparison unit comprises an operational transconductance amplifier (OTA).

\* \* \* \* \*